United States Patent Office 2,908,898
Patented Oct. 13, 1959

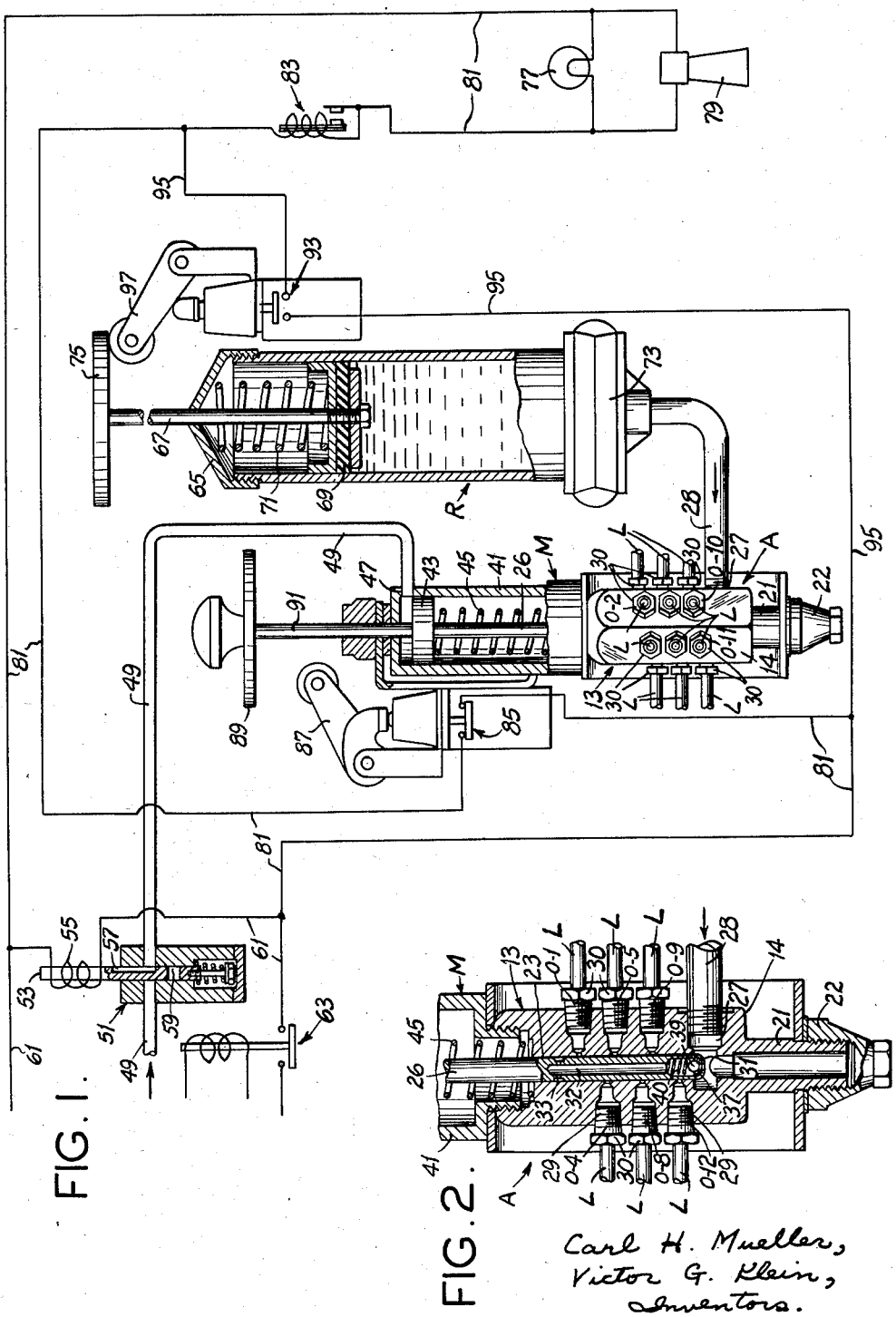

2,908,898

LUBRICATION SYSTEM

Carl H. Mueller, Pasadena Hills, and Victor G. Klein, Defiance, Mo., assignors to The McNeil Machine & Engineering Company, a corporation of Ohio Application May 14, 1956, Serial No. 584,679

4 Claims. (Cl. 340—270)

This invention relates to lubrication systems, and more particularly to a lubrication system of the type including a lubricant injector for dispensing measured charges of lubricant from a supply to individual points of lubrication, the injector comprising a cylinder having an inlet port, a series of longitudinally spaced outlet ports and a plunger working in the cylinder and adapted upon movement in one direction through a pressure stroke successively to force out individual charges through the successive outlet ports.

Among the several objects of the invention may be noted the provision of a system of the class described with means for indicating failure of lubrication by reason of failure of the injector plunger to complete a pressure stroke; the provision of a system of this class which may additionally include means for indicating failure of lubrication by reason of depletion of the lubricant supply; and the provision of a system of this class having the stated features which is economical to install and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a wiring diagram with certain parts of the system shown in section; and, Fig. 2 is a longitudinal section of an injector per se, on a larger scale than Fig. 1.

Corresponding reference characters indicate corresponding parts throughout the several views of the drawings.

Referring to the drawings, a lubricating system of this invention is shown to include a lubricant injector A for dispensing measured charges of lubricant from a supply to individual points of lubrication (not shown). As illustrated, this injector A is the same type as shown in U.S. Patent 2,715,454, patented August 16, 1955. In general, it comprises a cylinder designated in its entirety by the reference character 13. This cylinder 13 comprises an elongate cylinder block 14 having an integral cylindrical extension 21 at one end constituting its forward end. Threaded on this extension 21 is a closed head 22. The block 14 has a central longitudinal bore 23. A plunger 26 is movable in the cylinder 13 toward and away from its forward end (its lower end as viewed in Figs. 1 and 2). The plunger is dimensioned to have a sliding sealing fit in the bore 23.

The block 14 has a lateral inlet port 27 and a series of longitudinally spaced lateral outlet ports corresponding to the outlet ports 0—1 to 0—12 shown in U.S. Patent 2,715,454. The inlet port 27 is located adjacent the forward end of the block leading into the bore 23, and the outlet ports are located between the other end of the block (its rearward end) and the inlet port. Reference may be made to U.S. Patent 2,715,454 for details as to the disposition of the ports with respect to the periphery of the block. A lubricant supply line 28 leads to the inlet port from a lubricant reservoir R. Each outlet port at its outer end is formed as an enlarged threaded socket 29 for receiving a compression nut 30 for connection thereto of a lubricant delivery line L leading to a point of lubrication in the same manner as shown in U.S. Patent 2,715,454.

The forward or working end of the plunger toward the forward or head end of the cylinder 13 is designated 31. The plunger is made hollow for some distance from its working end 31 to provide a longitudinal passage generally designated 32 for communication from the space in the cylinder 13 ahead of the plunger to a lateral port 33 in the plunger spaced from its working end. The forward end of passage 32 is formed as a valve chamber and contains a check valve seat member 37 and a valve ball 39 adapted to engage the seat 37. The ball 39 is biased toward the seat by a compression spring 40.

The lateral port 33 in the plunger is formed as an annular peripheral groove with radial openings from the passage 32 to the groove. As in U.S. Patent 2,715,454, the intervals between the outlet ports are made equal to the width of the port or groove 33, and the distance from the working end 31 of the plunger 26 to the lower edge of the groove 33 as viewed in Fig. 2 is made equal to the distance from the lower edge of the inlet port 27 to the upper edge of the first outlet port 0—1. Thus, when the plunger is moved forward from the retracted charging position shown in the drawing, wherein it unblocks the inlet port 27, the groove 33 comes into communication with the first outlet port 0—1 as the plunger reaches the position where it blocks off the inlet port. When the plunger is in its retracted position, lubricant may flow through the inlet port into the space in cylinder 13 ahead of the plunger to charge the injector. The groove 33 is then located above the first outlet port 0—1 and is blocked.

The plunger 26 extends rearward out of the cylinder 13 into the cylinder 41 of an expansible chamber fluid motor M, more particularly an air motor. Plunger 26 has a piston 43 on its end in the cylinder 41. The piston 43 and plunger 26 are biased in rearward direction (toward the upper outer end of the air motor cylinder 41 as viewed in Fig. 1) by a spring 45. At the outer end of the cylinder 41 is a port 47. An air line 49 having a solenoid valve 51 therein leads from a source of compressed air (not shown) to the port 47. The solenoid valve, as illustrated, has a plunger 53 and an operating coil 55. When the operating coil 55 is de-energized, the plunger 53 occupies a retracted position for venting the air motor M and blocking the air inlet of the valve 51. When the operating coil is energized, the plunger 53 moves to an operating position in which it connects the motor M and the source of compressed air for operating the motor.

As illustrated, the valve 51 may be of a type in which the plunger is spring-biased to retracted position, formed with a passage 57 for venting the motor M while blocking the valve air inlet when retracted, and formed with another passage 59 for connecting the motor and the source of compressed air when the operating coil 55 is energized. The coil 55 is connected in a valve control circuit 61 including a control relay 63.

The lubricant reservoir R is shown as comprising a cylindrical lubricant container having a head 65. The head 65 is removably threaded on the upper end of the container. A piston rod 67 is slidable in the head 65 and has a piston 69 thereon within the container. A spring 71 biases the piston 69 downward to tend to force lubricant out through a port in the lower end head 73 of the container. The piston rod 67 has a switch operating member 75 on its outer end.

An electric signal lamp 77 and an electric horn 79 are connected in a circuit indicated at 81 which includes a thermostatic flasher 83 and an injector-controlled switch 85. This signal circuit 81 is interconnected with the valve circuit 61. A flasher is selected for 83 which requires more time to heat up initially to close its contacts than the time normally required by the injector plunger 26 to complete a pressure stroke. Switch 85 is normally closed. It has an operating arm 87 adapted for engagement by a switch operating member 89 on the outer end of an extension 91 of the plunger 26 for opening the switch 85 when the plunger completes a pressure stroke.

A normally open switch 93 is connected in a circuit 95 in parallel with the switch 85. Switch 93 has an operating arm 97 adapted for engagement by the member 75 on the outer end of the piston rod 67 of the lubricant reservoir R when the reservoir is empty for closing the switch 93.

Operation is as follows:

To initiate a cycle of lubrication, the coil of the relay 63 is energized by closure of a control switch (not shown) to close the valve circuit 61. This results in energizing the operating coil 55 of the solenoid valve 51. The plunger 53 of valve 51 is thereupon moved to operating position to supply compressed air to the motor M via valve passage 59 and line 49 to drive the plunger 26 of the injector A through a pressure stroke. The signal circuit 81 is not initially completed because the flasher 83 requires a substantial period of time to heat up for closure of its contacts. The flasher 83 delays closure of the signal circuit 81 for a period of time longer than the time normally required for the injector plunger 26 to complete its pressure stroke.

Assuming that everything is in order, when the plunger 26 completes its pressure stroke the member 89 acts to open the switch 85. This occurs before the flasher 83 has had sufficient time to heat up sufficiently for closure of its contacts. Accordingly, the lamp and the horn are not energized, and no warning signal is given.

If, however, the injector plunger 26 should not complete its pressure stroke for any reason, the switch 85 remains closed. Accordingly, after the elapse of the period of time required for the flasher 83 to heat up to the point where its contacts close, the lamp 77 and horn 79 are energized, thereby providing both a visual and an audible warning that there has been a failure of lubrication.

If at any time the supply of lubricant in the lubricant reservoir R should become exhausted, the member 75 on the piston rod 67 will close the switch 93 and the lamp 77 and horn 79 will be energized to warn that there has been a failure of lubrication. Inspection of the position of the member 75 will then reveal that the supply of lubricant is exhausted.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

We claim:

1. In a lubrication system comprising an injector, said injector comprising a cylinder having an inlet port, a series of longitudinally spaced outlet ports and a plunger working in the cylinder and adapted upon movement in one direction through a pressure stroke successively to force out individual charges through the successive outlet ports, means for indicating failure of the system to operate comprising an electric signal and a circuit therefor, means in the circuit for delaying the operation of the signal upon energization of said circuit for a period of time longer than the time normally required for the injector plunger to complete a pressure stroke, and means operable by the plunger as it completes a pressure stroke for opening the circuit.

2. In a lubrication system as set forth in claim 1, said delaying means comprising a flasher, said circuit-opening means comprising a normally closed switch in the circuit and means movable with the injector plunger for opening the switch when the plunger completes a pressure stroke.

3. In a lubrication system comprising an injector, said injector comprising a cylinder having an inlet port, a series of longitudinally spaced outlet ports and a plunger working in the cylinder and adapted upon movement in one direction through a pressure stroke successively to force out individual charges through the successive outlet ports, an expansible chamber fluid motor for operating the plunger, an electrically operated valve controlling the supply and exhaust of fluid for said motor, and a control circuit for said valve, means for indicating failure of the system to operate comprising an electric signal and a circuit therefor interconnected with said valve circuit, means in said signal circuit for delaying the operation of the signal upon energization of said signal circuit for a period of time longer than the time normally required for the injector plunger to complete a pressure stroke, and means operable by the plunger as it completes a pressure stroke for opening the signal circuit.

4. In a lubrication system as set forth in claim 3, said delaying means comprising a flasher, said circuit-opening means comprising a normally closed switch in the circuit and means movable with the injector plunger for opening the switch when the plunger completes a pressure stroke.

References Cited in the file of this patent

UNITED STATES PATENTS

| | | |
|---|---|---|
| 2,286,023 | Strang | June 9, 1942 |
| 2,399,171 | Davis | Apr. 30, 1946 |
| 2,339,532 | Venable | Jan. 18, 1944 |
| 2,667,235 | Le Clair | Jan. 26, 1954 |
| 2,676,315 | Kyle | Apr. 29, 1954 |